United States Patent
Hooper et al.

(10) Patent No.: US 7,126,952 B2
(45) Date of Patent: Oct. 24, 2006

(54) MULTIPROTOCOL DECAPSULATION/ENCAPSULATION CONTROL STRUCTURE AND PACKET PROTOCOL CONVERSION METHOD

(75) Inventors: Donald F. Hooper, Shrewsbury, MA (US); Stephanie L. Hirnak, Bedford, NH (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 09/966,349

(22) Filed: Sep. 28, 2001

(65) Prior Publication Data

US 2003/0067934 A1    Apr. 10, 2003

(51) Int. Cl.
*H04L 12/28*    (2006.01)
*H04J 3/22*    (2006.01)
(52) U.S. Cl. ..................... 370/401; 370/466
(58) Field of Classification Search .......... 370/401, 370/389, 392, 393, 395.1, 395.31, 395.5, 370/395.52, 395.54, 395.6; 709/223
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,736,566 A | 5/1973 | Anderson et al. |
| 3,792,441 A | 2/1974 | Wymore et al. |
| 3,940,745 A | 2/1976 | Sajeva |
| 4,016,548 A | 4/1977 | Law et al. |
| 4,032,899 A | 6/1977 | Jenny et al. |
| 4,075,691 A | 2/1978 | Davis et al. |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,709,347 A | 11/1987 | Kirk |
| 4,745,544 A | 5/1988 | Renner et al. |
| 4,788,640 A | 11/1988 | Hansen |
| 4,831,358 A | 5/1989 | Ferrio et al. |
| 4,866,664 A | 9/1989 | Burkhardt, Jr. et al. |
| 4,890,218 A | 12/1989 | Bram |
| 4,890,222 A | 12/1989 | Kirk |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. ................. 370/60 |
| 5,255,239 A | 10/1993 | Taborn et al. |

(Continued)

FOREIGN PATENT DOCUMENTS

EP    0 379 709    8/1990

(Continued)

OTHER PUBLICATIONS

"10-/100-Mbps Ethernet Media Access Controller (MAC) Core"; NEC Electronics Inc., pp. 1-5, (Dec. 1998).

(Continued)

*Primary Examiner*—Seema S. Rao
*Assistant Examiner*—Kevin Mew
(74) *Attorney, Agent, or Firm*—Fish & Richardson P.C.

(57) ABSTRACT

A network packet may be forwarded by reading a table containing a plurality of flags to determine which of the plurality of flags is set or cleared and performing an operation on the packet to decapsulate or encapsulate the packet in accordance with values of the flags.

31 Claims, 10 Drawing Sheets

U.S. PATENT DOCUMENTS

| | | |
|---|---|---|
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung |
| 5,404,482 A | 4/1995 | Stamm et al. |
| 5,404,484 A | 4/1995 | Schlansker et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,459,843 A | 10/1995 | Davis |
| 5,463,625 A | 10/1995 | Yasrebi |
| 5,467,452 A | 11/1995 | Blum et al. |
| 5,485,455 A | 1/1996 | Dobbins et al. |
| 5,515,296 A | 5/1996 | Agarwal |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A | 12/1996 | Nistala et al. |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,630,641 A | 5/1997 | Mori et al. |
| 5,644,623 A | 7/1997 | Gutledge |
| 5,649,157 A | 7/1997 | Williams |
| 5,651,002 A | 7/1997 | Van Seters et al. ......... 370/392 |
| 5,659,687 A | 8/1997 | Kim et al. |
| 5,680,641 A | 10/1997 | Sidman |
| 5,689,566 A | 11/1997 | Nguyen |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A * | 5/1998 | Davis et al. ................. 709/200 |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A | 7/1998 | Born |
| 5,781,774 A | 7/1998 | Krick |
| 5,784,649 A | 7/1998 | Begur |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,530 A | 12/1998 | Chen et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,701 A | 4/1999 | Johnson |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,918,235 A | 6/1999 | Kirshenbaum et al. |
| 5,928,736 A | 7/1999 | Parekh |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kime |
| 5,961,628 A | 10/1999 | Nguyen et al. |
| 5,970,013 A | 10/1999 | Fischer et al. |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,058,168 A | 5/2000 | Braband |
| 6,061,710 A | 5/2000 | Eickemeyer et al. |
| 6,067,300 A | 5/2000 | Baumert et al. |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,111,886 A | 8/2000 | Stewart |
| 6,112,016 A | 8/2000 | MacWilliams et al. |
| 6,134,665 A | 10/2000 | Klein et al. |
| 6,141,677 A | 10/2000 | Hanif et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,170,051 B1 | 1/2001 | Dowling |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,274 B1 | 4/2001 | Catthoor et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,520 B1 | 8/2001 | Sharangpani et al. |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,282,169 B1 | 8/2001 | Kiremidjian |

| | | |
|---|---|---|
| 6,286,083 B1 | 9/2001 | Chin et al. |
| 6,289,011 B1 | 9/2001 | Seo et al. |
| 6,295,600 B1 | 9/2001 | Parady et al. |
| 6,298,370 B1 | 10/2001 | Tang et al. |
| 6,307,789 B1 | 10/2001 | Wolrich et al. |
| 6,311,261 B1 | 10/2001 | Chamdani et al. |
| 6,324,624 B1 | 11/2001 | Wolrich et al. |
| 6,338,078 B1 | 1/2002 | Chang et al. |
| 6,345,334 B1 | 2/2002 | Nakagawa et al. |
| 6,347,344 B1 | 2/2002 | Baker et al. |
| 6,356,692 B1 | 3/2002 | Ido et al. |
| 6,360,262 B1 | 3/2002 | Guenthner et al. |
| 6,366,998 B1 | 4/2002 | Mohamed |
| 6,373,848 B1 | 4/2002 | Allison et al. |
| 6,389,449 B1 | 5/2002 | Nemirovsky et al. |
| 6,393,026 B1 | 5/2002 | Irwin |
| 6,393,483 B1 | 5/2002 | Latif et al. |
| 6,415,338 B1 | 7/2002 | Habot |
| 6,424,659 B1 | 7/2002 | Viswanadham et al. |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,453,404 B1 | 9/2002 | Bereznyi et al. |
| 6,463,072 B1 | 10/2002 | Wolrich et al. |
| 6,463,480 B1 | 10/2002 | Kikuchi et al. |
| 6,463,527 B1 | 10/2002 | Vishkin |
| 6,466,898 B1 | 10/2002 | Chan |
| 6,477,562 B1 | 11/2002 | Nemirovsky et al. |
| 6,484,224 B1 | 11/2002 | Robins et al. |
| 6,526,451 B1 | 2/2003 | Kasper et al. |
| 6,529,983 B1 | 3/2003 | Marshall et al. |
| 6,532,509 B1 | 3/2003 | Wolrich et al. |
| 6,535,878 B1 | 3/2003 | Guedalia et al. |
| 6,552,826 B1 | 4/2003 | Adler et al. |
| 6,553,406 B1 | 4/2003 | Berger et al. |
| 6,560,667 B1 | 5/2003 | Wolrich et al. |
| 6,570,850 B1 | 5/2003 | Gutierrez et al. |
| 6,577,542 B1 | 6/2003 | Wolrich et al. |
| 6,584,522 B1 | 6/2003 | Wolrich et al. |
| 6,587,906 B1 | 7/2003 | Wolrich et al. |
| 6,604,125 B1 | 8/2003 | Belkin |
| 6,606,704 B1 | 8/2003 | Adiletta et al. |
| 6,625,654 B1 | 9/2003 | Wolrich et al. |
| 6,629,236 B1 | 9/2003 | Aipperspach et al. |
| 6,631,422 B1 | 10/2003 | Althaus et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,667,920 B1 | 12/2003 | Wolrich et al. |
| 6,668,317 B1 | 12/2003 | Bernstein et al. |
| 6,671,827 B1 | 12/2003 | Guilford et al. |
| 6,675,190 B1 | 1/2004 | Schabernack et al. |
| 6,678,746 B1 | 1/2004 | Russell et al. |
| 6,681,300 B1 | 1/2004 | Wolrich et al. |
| 6,694,380 B1 | 2/2004 | Wolrich et al. |
| 6,792,488 B1 | 9/2004 | Wolrich et al. |
| 6,826,615 B1 * | 11/2004 | Barrall et al. ............... 709/227 |
| 6,876,561 B1 | 4/2005 | Wolrich et al. |
| 6,895,457 B1 | 5/2005 | Wolrich et al. |
| 6,925,637 B1 | 8/2005 | Thomas et al. |
| 6,952,824 B1 | 10/2005 | Hooper et al. |
| 6,976,095 B1 | 12/2005 | Wolrich et al. |
| 6,983,350 B1 | 1/2006 | Adiletta et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0148382 A1 * | 7/2004 | Narad et al. ............... 709/223 |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 959 602 A1 | 11/1999 |
| JP | 59111533 | 6/1984 |
| WO | WO 94/15287 | 7/1994 |
| WO | WO 97/38372 | 10/1997 |
| WO | WO 98/20647 | 5/1998 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 A1 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/030461 | 4/2003 |

OTHER PUBLICATIONS

Beckerle, M.J., "Overview of the START (*T) multithreaded computer" Compcon Spring '93, Digest of Papers, Feb. 22-26, 1993, San Francisco, California, pp. 148-156 (1993), (abstract only).

Byrd et al., "Multithreaded Processor Architectures," IEEE Spectrum, 32(8): 38-46, (Aug. 1995).

Chandranmenon, G.P. et al., "Trading Packet Headers for Packet Processing," IEEE/ACM Transactions on Networking 4(2): 141-152 (Apr. 1996).

Dictionary of Computer Words: An A to Z Guide to Today's Computers, Revised Editors, Houghton Mifflin Company: Boston, Massachusetts, pp. 220, (1995).

Digital Semiconductor 21140A PCI Fast Ethernet LAN Controller, Hardware Reference Manual, Digital Equipment Corporation, pp. i-x, 1-1 through 1-5, 2-1 throught 2-12, 3-1 through 3-38, 4-31 through 5-2, 6-1 through 6-24 (Mar. 1998).

Doyle et al. (Eds.), *Microsoft Press Computer Dictionary*, 2$^{nd}$ ed., Microsoft Press: Redmond: Washington, USA, pp. 326, (1994).

English language abstract of Japanese Patent Application JP59111533, published Jun. 27, 1984, entitled: "Digital Data Arithmetic Circuit".

Fillo et al., "The M-Machine Multicomputer," IEEE Proceedings of MICRO-28, pp. 146-156, (1995).

Frazier, H., "Gigabit Ethernet: From 100 to 1,000 Mbps", IEEE Internet Computing, pp. 24-31, (Jan./Feb. 1999).

Frazier, H., "The 802.3z Gigabit Ethernet Standard", IEEE Network, pp. 6-7, (May/Jun. 1998).

Gomez et al., "Efficient Multithreaded User-Space Transport for Network Computing: Design and Test of the TRAP Protocol," Journal of Parallel and Distributed Computing, 40(1):103-117, (1997).

Haug et al., "Reconfiguration hardware as shared resource for parallel threads," IEEE Symposium on FPGAs for Custom Computing Machines, 2 pages, (1998).

Hauser et al., "Garp: a MIPS processor with a reconfigurable coprocessor," Proceedings of the 5$^{th}$ Annual IEEE Symposium on Field-Programmable Custom Computing Machines, pp. 12-21, (1997).

Hyde, R.L., "Overview of Memory Management," Byte, 13(4):219-225, (1998).

Ippoliti et al., "Parallel Media Access Controller for Packet Communications at Gb/S Rates", ICC/Supercom'90, Atlanta, Georgia, Apr. 15, 1990, IEEE, pp. 991-996 (1990).

Jenks, G. and J.L. Gaudiot, "Nomatic Threads: A migrating multithread approach to remote memory accesses in multiprocessors", Proceedings of the 1996 Conference on Parallel Architecture and Compilation Techniques, Oct. 20-23, 1996, Boston, Massachusetts, (abstract only).

Litch, T. and J. Slaton, "StrongARMing Portable Communications," IEEE Micro, pp. 48-55 (Mar./Apr. 1998).

News.Com, Aug. 26, 1999. "Enterprise Hardware, Intel Expected to Unveil New Networking Chip," http://new.com.com/Intel+expected+to+unveil+new+networking+chip/2100-1001 3-230315.html (accessed on Aug. 23, 2005), pp. 1-5.

Schmidt et al., "The Performance of Alternative Threading Architectures for Parallel Communication Subsytems," http://www/cs.wustl.edu/~schmidt/PDF/JPDC-96.pdf#search = The%20Performance%20of%20Alternative%20Threading%20Architectures %20for%20Parallel%20Communication%20Subsytems' Nov. 13, 1998., pp. 1-19.

Thistle et al., "A Processor Architecture for Horizon," Proceedings Supercomputing '88, IEEE Computer Society, Nov. 14-18, 1988, Orlando, Florida, pp. 35-41 (1988).

Tremblay et al., "A Three Dimensional Register File for Superscalar Processors," IEEE Proceedings of the 28th Annual Hawaii International Conference on System Sciences, pp. 191-201 (1995).

Trimberger et al, "A time-multiplexed FPGA," Proceedings of the 5th Annual IEEE Symposium on Field-Programmable Custom Computing Machines, pp. 22-28, (1998).

Turner et al., "Design of a High Performance Active Router," Washington University in Saint Louis, Applied Research Lab, Online Internet Document, Mar. 18, 1999 (20 pages).

Vibhatavanijt et al., "Simultaneous Multithreading-Based Routers," Proceedings of the 2000 International Conference of Parallel Processing, Toronto, Ontario, Canada, Aug. 21-24, 2000, pp. 362-369.

Wazlowski et al., "PRISM-II computer and architecture," IEEE Workshop on FPGAs for Custom Computing Machines, pp. 9-16, (1993).

\* cited by examiner

| Decap Flag | Decap To Layer | Decap Byte Count | Current Encap | Encap Flag | Encap Byte Count | Encap Bytes | Next Table Type | Next Table Addr |
|---|---|---|---|---|---|---|---|---|

FIG. 5

MULTIPROTOCOL DECAPSULATION/ENCAPSULATION CONTROL STRUCTURE AND PACKET PROTOCOL CONVERSION METHOD

BACKGROUND

This invention relates to forwarding network packets between network domains.

Packets are routed through a series of router devices, each of which stores and forwards packets on its way from a source to a destination. For example, a packet may start out as an Internet packet, be forwarded over an ATM (asynchronous transfer mode path) and then back to Ethernet onto a corporate network to its final intended recipient. As the network passes through these network domains, various header encapsulations may be added to or removed from the packet. Some connections use point-to-point protocol (PPP) whereas others use multiprotocol label switching MPLS, layer to tunneling protocol LTTP, ATM and so forth.

DESCRIPTION OF DRAWINGS

FIGS. 2-1 to 2-4 are a detailed block diagram of a hardware based multithreaded processor of FIG. 1.

FIG. 3 is a block diagram depicting a functional arrangement of the multithreaded processor of FIG. 2.

FIG. 4 is a block diagram depicting data structures in memory used for the processor of FIG. 1.

FIG. 5 is a block diagram depicting formats for forwarding tables used in the tables of FIG. 4.

DETAILED DESCRIPTION

Figure 1:
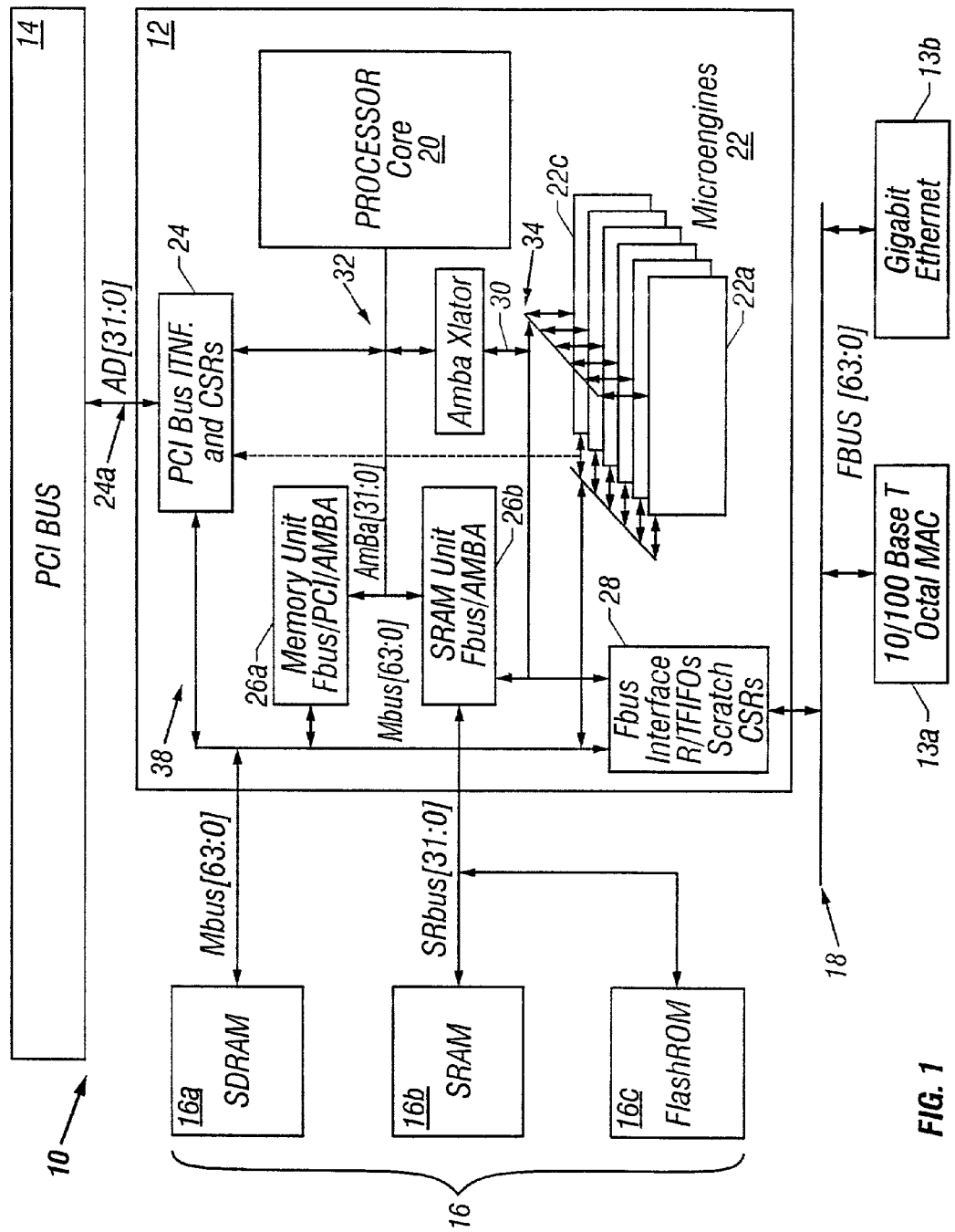
FIG. 1 is a block diagram of a communication system employing a hardware based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each can be simultaneously active and work on multiple hardware controlled threads that independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the processor 20 is a Strong Arm® based architecture. The general purpose microprocessor 20 has an operating system. Through the operating system the processor 20 can call functions to operate on microengines 22a–22f. The processor 20 can use any supported operating system preferably a real time operating system such as, MicrosoftNT real-time, VXWorks.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six microengines 22a–22f access either the SDRAM 16a or SRAM 16b based on characteristics of the data. Thus, low latency, low bandwidth data is stored in and fetched from SRAM, whereas higher bandwidth data for which latency is not as important, is stored in and fetched from SDRAM. The microengines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a microengine will cause the SRAM controller 26b to initiate an access to the SRAM memory 16b. The SRAM controller controls arbitration for the SRAM bus, accesses the SRAM 16b, fetches the data from the SRAM 16b, and returns data to a requesting microengine 22a–22b. During an SRAM access, if the microengine e.g., 22a had only a single thread that could operate, that microengine would be dormant until data was returned from the SRAM. By employing hardware context swapping within each of the microengines 22a–22f, the hardware context swapping enables other contexts with unique program counters to execute in that same microengine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one microengine 22a and have one more thread available to process more work in the data path.

The hardware context swapping also synchronizes completion of tasks. For example, two threads could hit the same shared resource e.g., SRAM. Each one of these separate functional units, e.g., the FBUS interface 28, the SRAM controller 26a, and the SDRAM controller 26b, when they complete a requested task from one of the microengine thread contexts reports back a flag signaling completion of an operation. When the flag is received by the microengine, the microengine can determine which thread to turn on.

One example of an application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general the network process can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed. Another example for use of processor 12 is a print engine for a postscript processor or as a processor for a storage subsystem, i.e., RAID disk storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, which is currently gaining acceptance as the best bus for Media Access Controller (MAC) devices.

The processor 12 includes a second interface e.g., a PCI bus interface 24 that couples other system components that reside on the PCI 14 bus to the processor 12. The PCI bus interface 24, provides a high speed data path 24a to memory 16 e.g., the SDRAM memory 16a. Through that path data can be moved quickly from the SDRAM 16a through the PCI bus 14, via direct memory access (DMA) transfers. Additionally, the PCI bus interface 24 supports target and master operations. Target operations are operations where slave devices on bus 14 access SDRAMs through reads and writes that are serviced as a slave to target operation. In master operations, the processor core 20 sends data directly to or receives data directly from the PCI interface 24.

Each of the functional units are coupled to one or more internal buses. The processor includes an AMBA bus that couples the processor core 20 to the memory controller 26a, 26c and to an AMBA translator 30 described below. The processor also includes a private bus 34 that couples the microengine units to SRAM controller 26b, AMBA translator 30 and FBUS interface 28. A memory bus 38 couples the memory controller 26a, 26b to the bus interfaces 24 and 28 and memory system 16 including flashrom 16c used for boot operations and so forth.

Referring to FIGS. 2-1 to 2-4, each of the microengines 22a–22f includes an arbiter that examines flags to determine the available threads to be operated upon. Any thread from any of the microengines 22a–22f can access the SDRAM controller 26a, SDRAM controller 26b or FBUS interface 28. The memory controllers 26a and 26b each include a plurality of queues to store outstanding memory reference requests. The queues either maintain order of memory references or arrange memory references to optimize memory bandwidth. For example, if a thread_0 has no dependencies or relationship to a thread_1, there is no reason that thread 1 and 0 cannot complete their memory references to the SRAM unit out of order. The microengines 22a–22f issue memory reference requests to the memory controllers 26a and 26b. The microengines 22a–22f flood the memory subsystems 26a and 26b with enough memory reference operations such that the memory subsystems 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM. With memory references to SRAM, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads. On the SDRAM, reference sorting allows hiding of pre-charges from one bank to another bank. Specifically, if the memory system 16b is organized into an odd bank and an even bank, while the processor is operating on the odd bank, the memory controller can start precharging the even bank. Precharging is possible if memory references alternate between odd and even banks. By ordering memory references to alternate accesses to opposite banks, the processor 12 improves SDRAM bandwidth.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM. If the hash does not successfully resolve, the packet header is sent to the processor core 20 for additional processing. The FBUS interface 28 supports the following internal data transactions:

| | | |
|---|---|---|
| FBUS unit | (via AMBA bus) | to/from processor Core. |
| FBUS unit | (via private bus) | to/from SRAM Unit. |
| FBUS unit | (via Mbus) | to/from SDRAM. |

The FBUS 18 is a standard industry bus and includes a data bus, e.g., 64 bits wide and sideband control for address and read/write control. The FBUS interface 28 provides the ability to input large amounts of data using a series of input and output FIFO's 29a–29b. From the FIFOs 29a–29b, the microengines 22a–22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the microengines can move data from the SDRAM 26a to interface 28, out to FBUS 18, via the FBUS interface 28.

Data functions are distributed amongst the microengines. Connectivity to the SRAM 26a, SDRAM 26b and FBUS 28 is via command requests. A command request can be a memory request or a FBUS request. For example, a command request can move data from a register located in a microengine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the microengines. This enables microengines 22a–22f, to have local access to data rather than arbitrating for access on a bus and risk contention for the bus. With this feature, there is a 0 cycle stall for waiting for data internal to the microengines 22a–22f.

The data buses, e.g., AMBA bus 30, SRAM bus 34 and SDRAM bus 38 coupling these shared resources, e.g., memory controllers 26a and 26b are of sufficient bandwidth such that there are no internal bottlenecks. Thus, in order to avoid bottlenecks, the processor 12 has an bandwidth requirement where each of the functional units is provided with at least twice the maximum bandwidth of the internal buses. As an example, the SDRAM can run a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz which is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the microengines 22a–22f and transfer registers located at any of the microengines 22a–22f, the core processor 20 access the microengines 22a–22f via the AMBA Translator 30 over bus 34. The AMBA translator 30 can physically reside in the FBUS interface 28, but logically is distinct. The AMBA Translator 30 performs an address translation between FBUS microengine transfer register locations and core processor addresses (i.e., AMBA bus) so that the core processor 20 can access registers belonging to the microengines 22a–22c.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm® architecture but it is implemented with a five stage pipeline for performance reasons. The processor core 20 also includes a 16 kilobyte instruction cache 52, an 8 kilobyte data cache 54 and a prefetch stream buffer 56. The core processor 20 performs arithmetic operations in parallel with memory writes and instruction fetches. The core processor 20 interfaces with other functional units via the ARM defined AMBA bus. The AMBA bus is a 32-bit bi-directional bus 32.

Figures 1, 2:
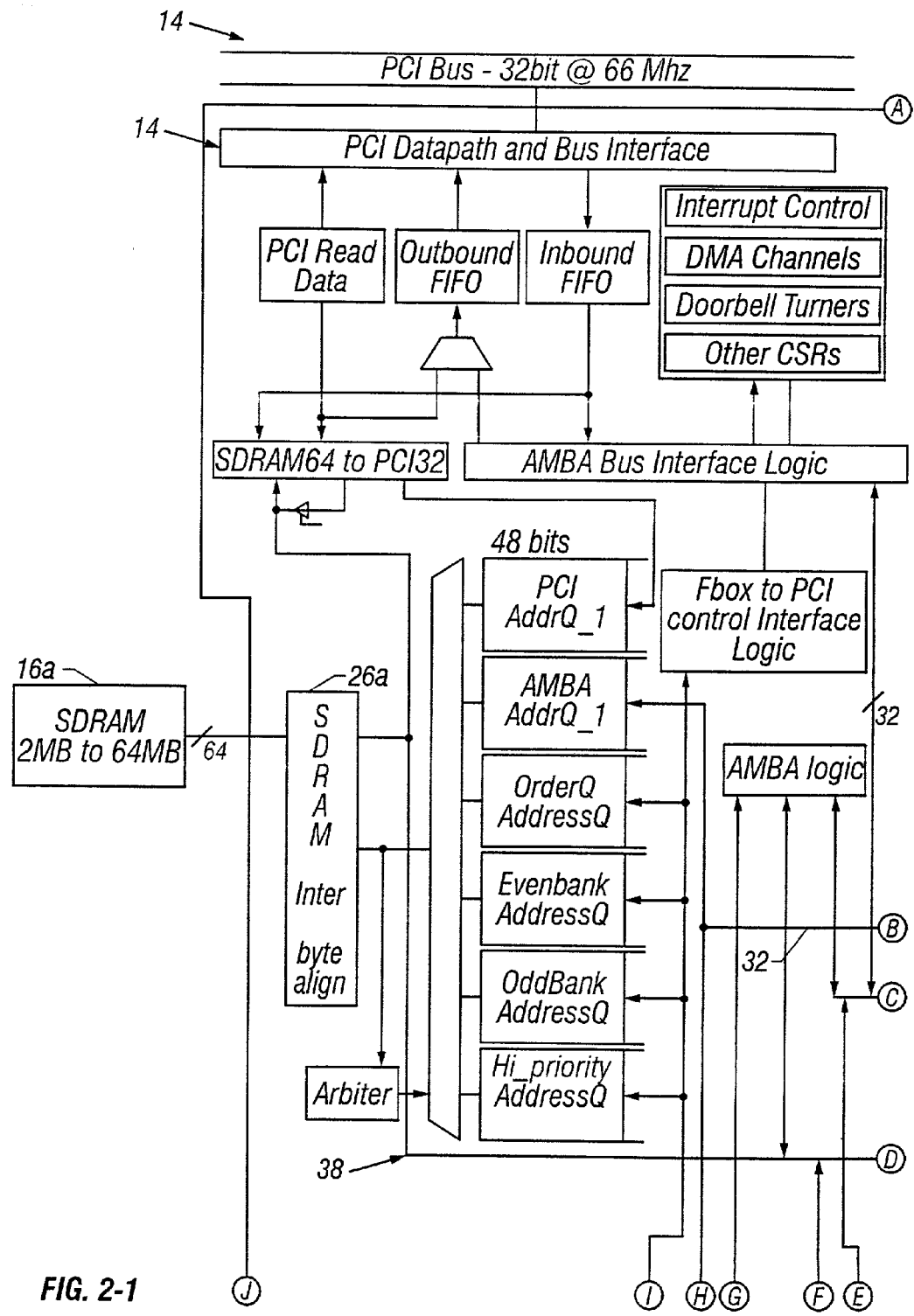
Figure 2:
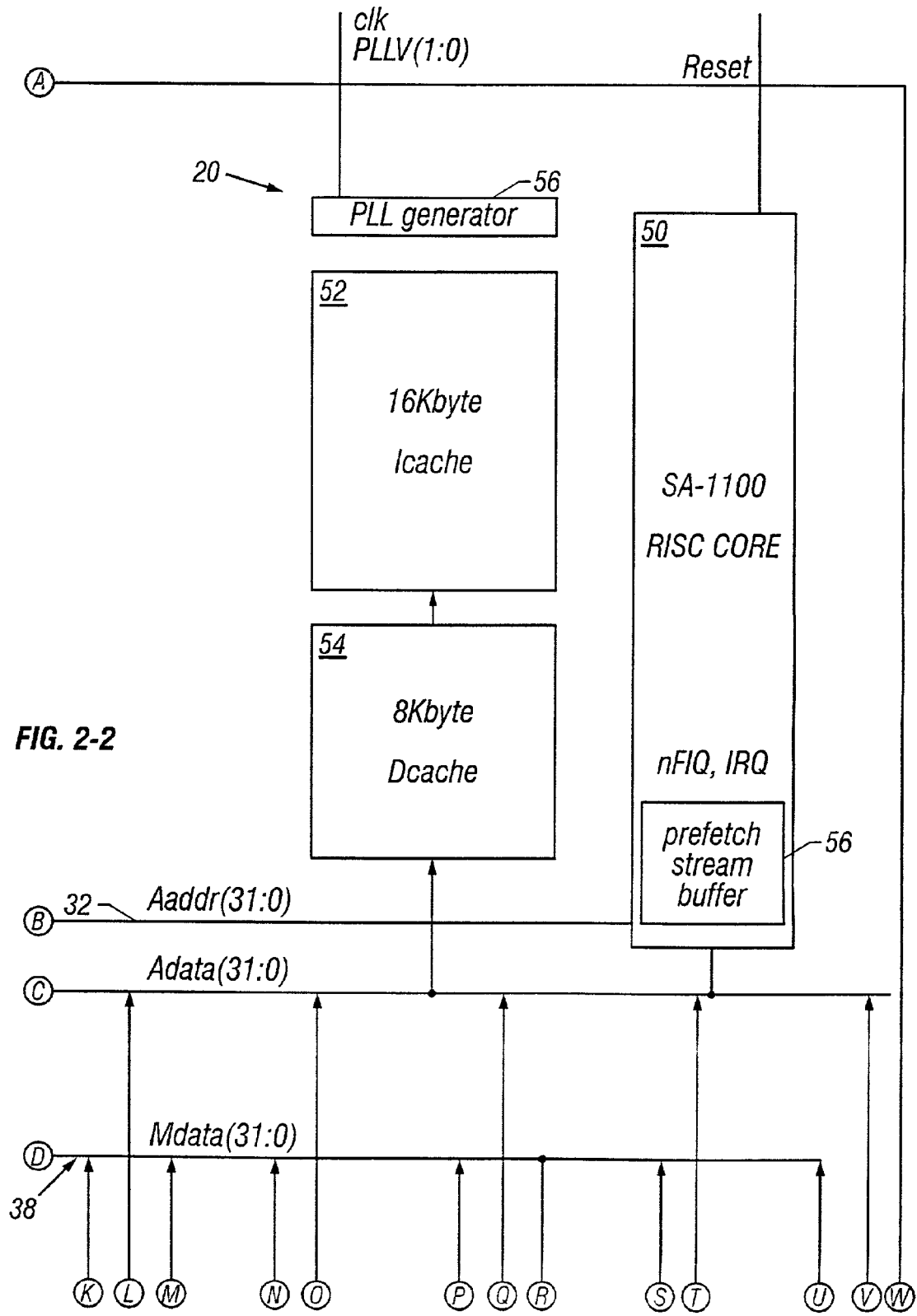
Figures 2, 3:
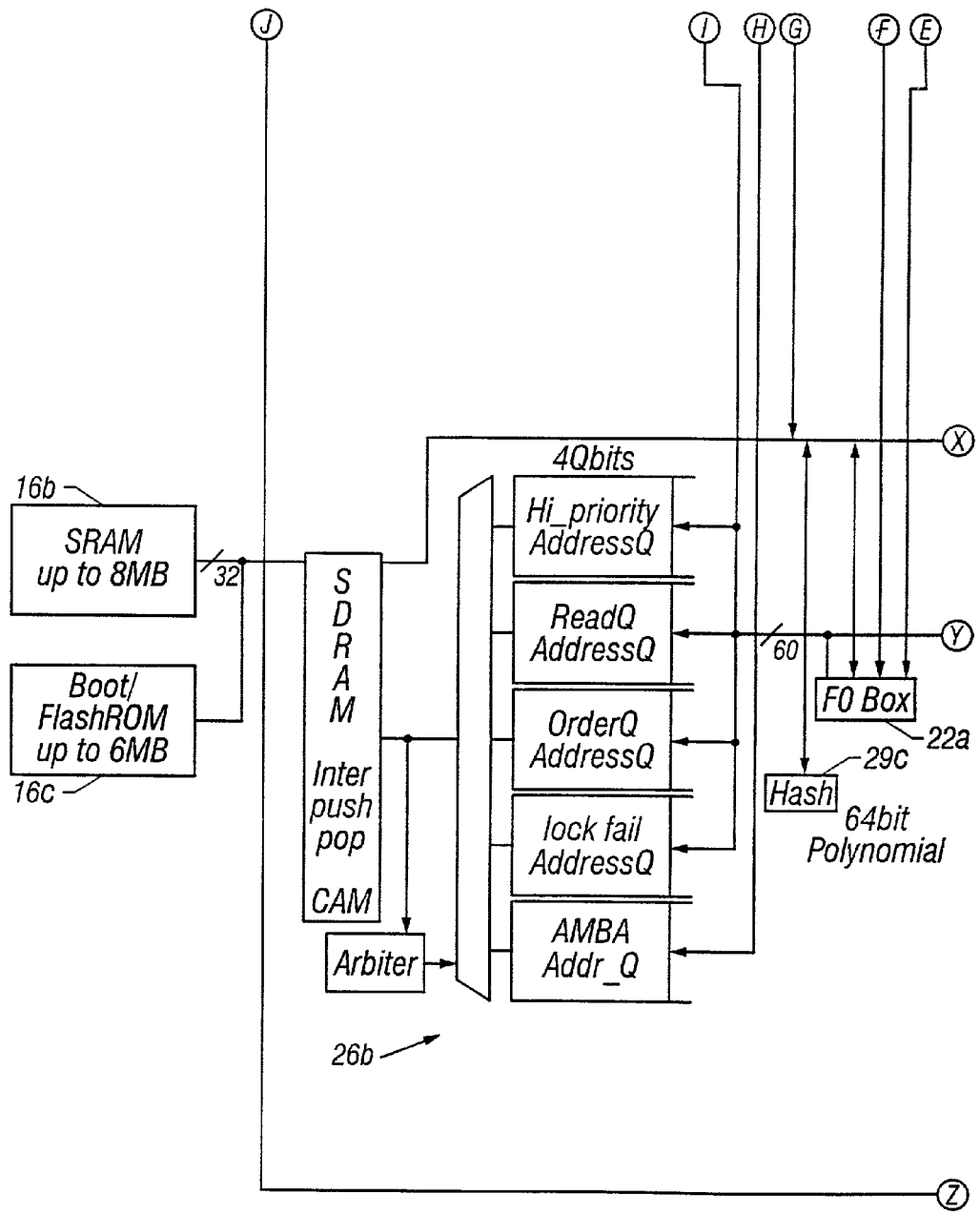

Referring to FIG. 3, the multiprocessor 12 is shown performing network routing functions. In one example, an asynchronous transfer mode (ATM), Ethernet and other types of packets enter through the network interface MAC devices and are sent to the network processor 12. These packets are processed in an application on the general purpose microprocessor 20 or on another processor that is coupled through the PCI bus interface (not shown). For reception and transmission of such packets, the application running on that processor 20 or the processor coupled through the PCI bus, makes use of a network stack 72, which includes network management, control and signaling processes 74 to manage network communications.

The network stack 72 and the application run in the processor 20 that controls the microengines, or another processor coupled to the PCI bus. The paths of receive, transmit and data forwarding represent the transport of the packets through the processor 12. The management control, signaling, and the network stack 72 usually are not involved in data forwarding. Essentially, the processor 20 receives and transmits. The processor 20 generates new packets that are transmitted over the network. The processor 20 can be involved in data forwarding in the exceptional case. This would involve very unusual packets, which may need special handling and complex processing.

For data forwarding processes, the microengines 22a–22f are used. In some instances, data forwarding may occur at the general purpose processor 20 level. The signals Init is programmer's interface for initialization of microengine code. The signal Fini is used for termination (to put control info in a known state). The microengines 22a–22f provide fast, store and forward capabilities. The engines use a multilayer generic look-up process that performs validation, classification, policing and filtering using parallel hardware supported threads of the process. Exceptions and control packets are passed to the processor 20 for processing at the network stack 72. A ternary network stack (not shown) can be located off-chip at a host via the PCI port or device port. This can be used to off-load the processor 20 or centralized management and control for one place. In some embodiments, the microengine is a compact RISC processor and can have limited instruction space. For this reason and for other reasons, it is desirable to reduce instruction code size when running multiple protocols. The network processor 12 implements a generic forwarding process that can be used to handle various protocol types (both existing and future types) without exceeding instruction storage limits.

Figures 2, 3, 4:
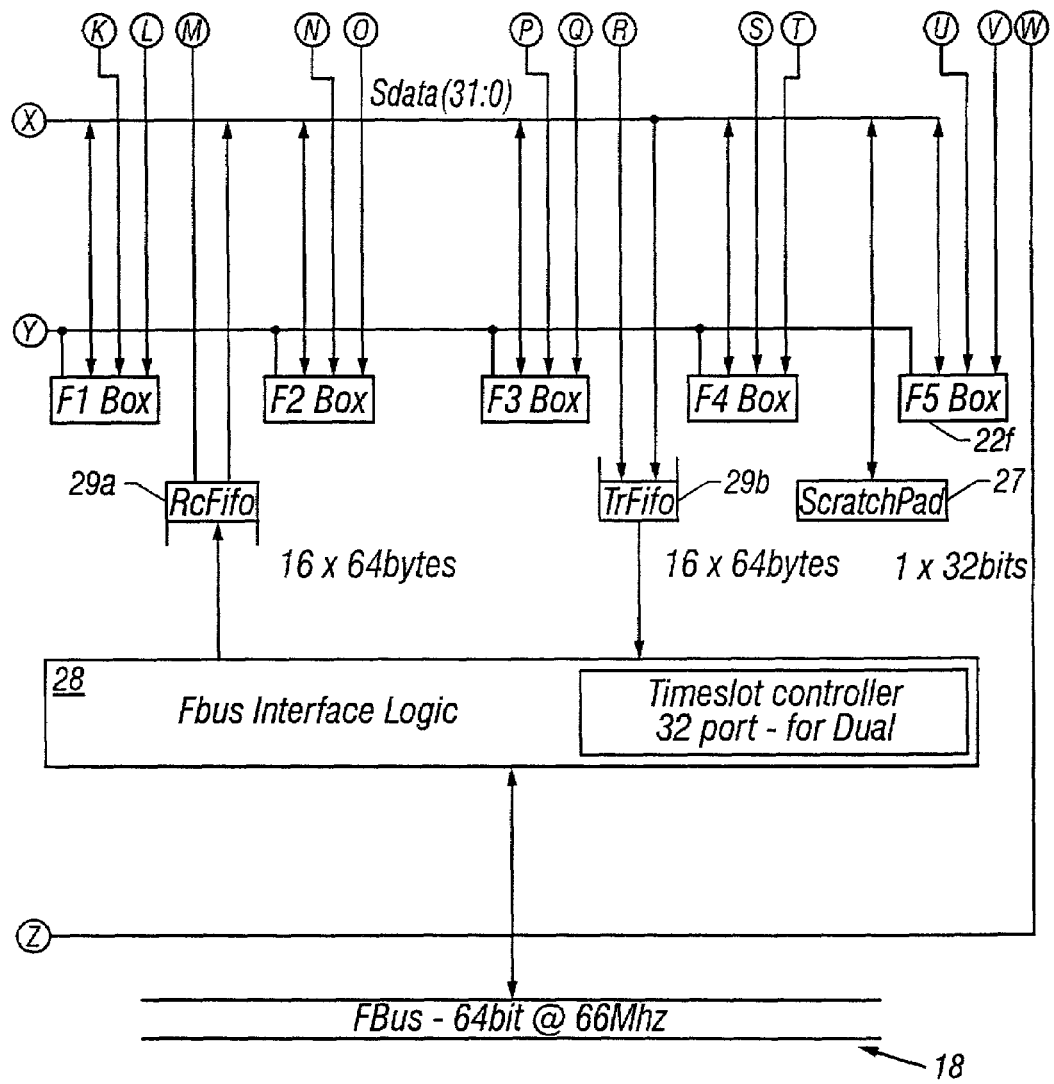
Figure 3:
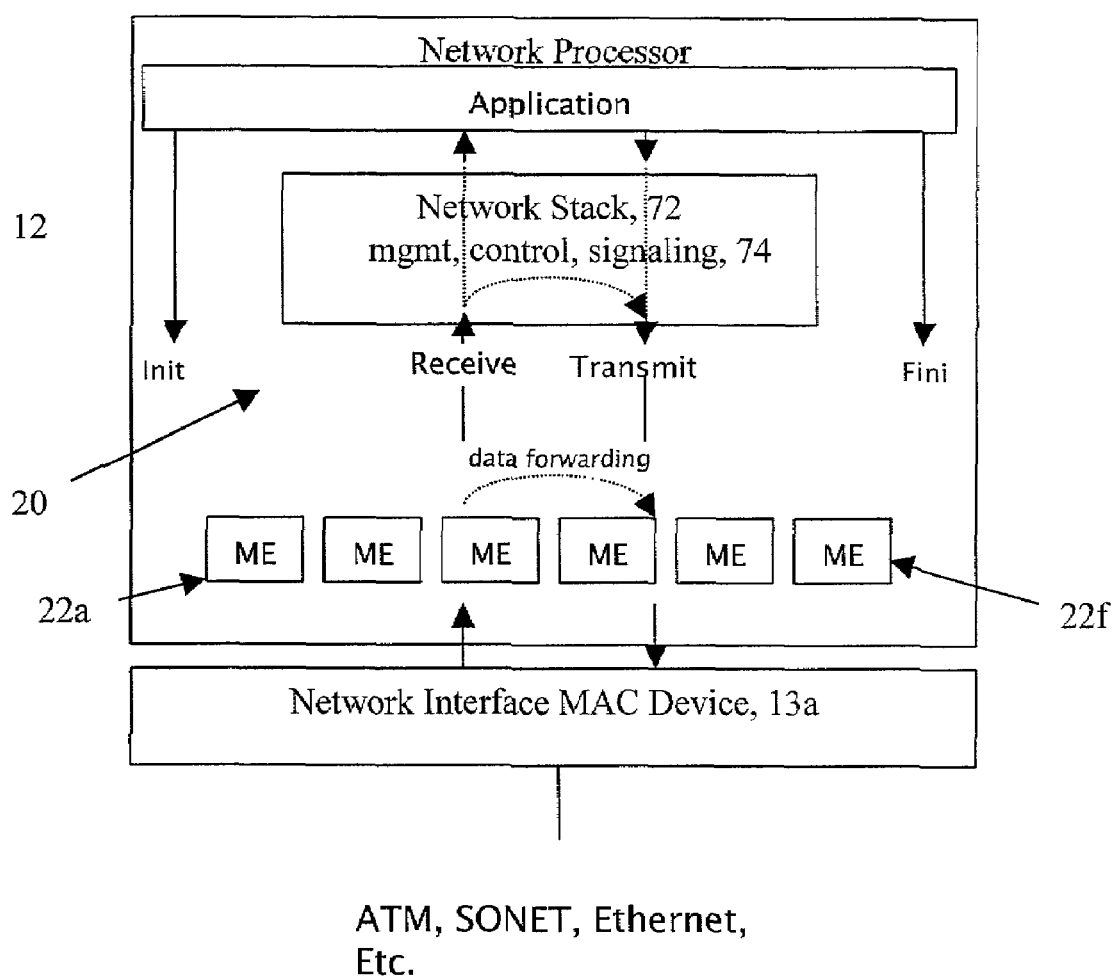
Figure 4:
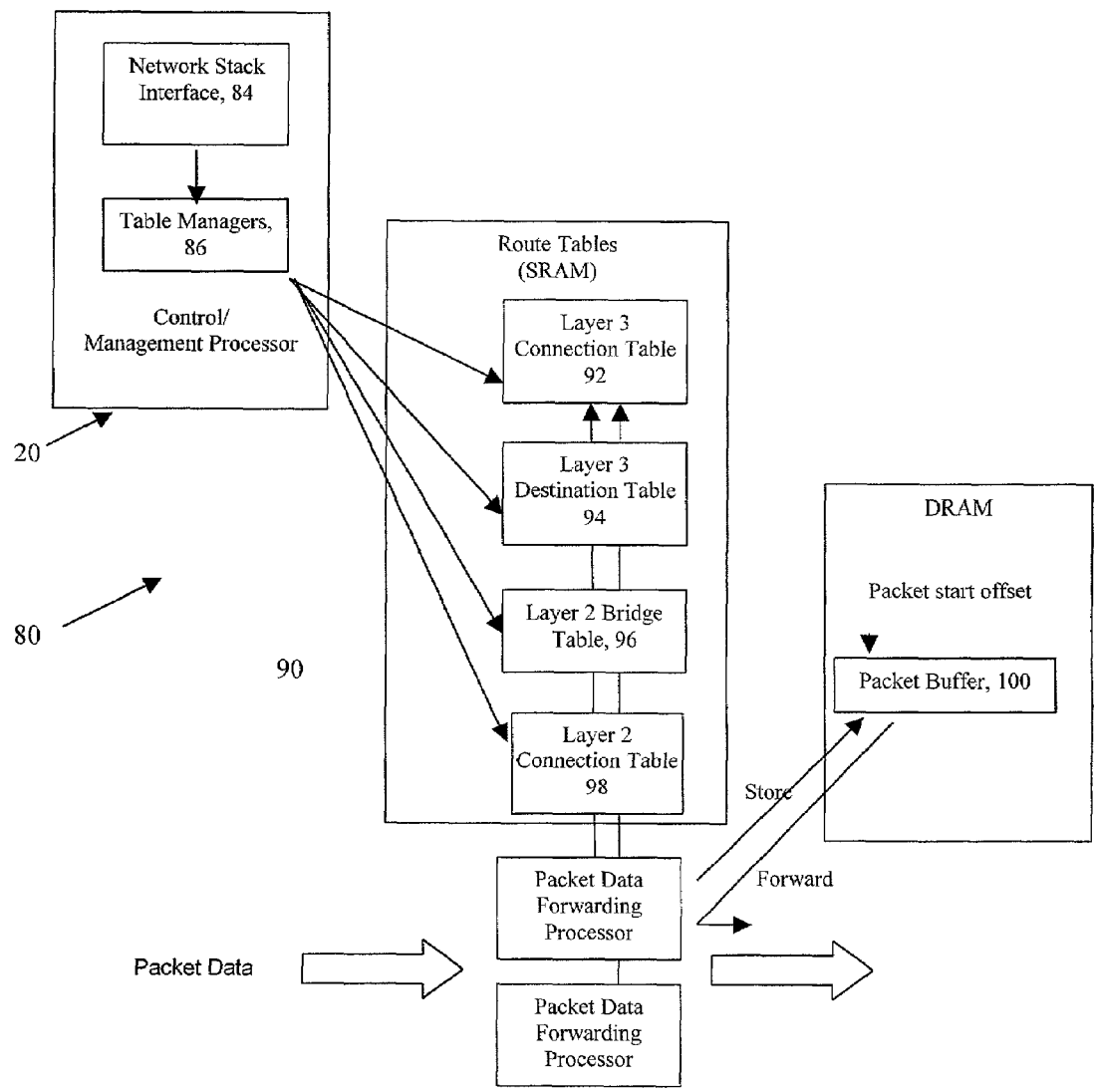

Referring now to FIG. 4, an management arrangement 80 for forwarding table structures 90 that are stored in memory is shown. The forwarding table structure management 80 includes a control and management structure 82 including a network stack interface 84 and table managers 86. The table managers 86 manage routing tables 90 that are stored in SRAM and can include a plurality of tables such as shown in FIG. 4 including a layer 4 connection table 92, a layer 3 destination table 94, a layer 2 bridge table 96 and a layer 2 connection table 98. Additionally, data structures stored in memory can include a packet buffer 100, which is stored in DRAM. The microengines acting as packet data forwarding processors retrieve information from the routing tables 90 in SRAM and store and forward the packet information from the packet buffer in DRAM. The multiple tables 90 are set up by the control management processor 20. For example, a layer 2 connection table 96 can be used for ATM virtual circuits, frame relay connections MPLS labels or other low level connections. A layer 2 bridge table 96 could be used for Ethernet bridging. A layer 3 destination table 94 could be used for Internet protocol (IP) forwarding based on a destination IP address. The layer 3 connection table 92 could be used for IP forwarding based on source and destination ports, addresses and protocol. All these tables may require that the packet be decapsulated or encapsulated.

Once the tables 90 are populated with forwarding information in a generally conventional manner, packet data forwarding processors can receive packets, perform table look-ups to obtain information and convert packets as required by the table entry. The control management process sets up the tables 90 with a common format for the purpose of decapsulation and encapsulation.

Referring now to FIG. 5, exemplary table entries, a subset of which are included in each of the tables 90, is shown. The table entries include the following fields:

Forwarding Table Format

Decap Flag. Indicates whether the bytes should be stripped from the packet. If this flag is asserted, then the number of bytes to strip is in Decap Byte Count field.

Decap To Layer. This field specifies decapsulation of header layers up to the specified layer. The length of the layer and hence the decapsulation is determined by parsing the packet header.

Decap Byte Count. This field specifies the number of bytes to remove from the front of the packet. Decap is performed by adjusting the packet start offset in the packet buffer.

Current Encap. This field specifies an identifier of the current packet encapsulation type.

Encap Flag. Indicates whether bytes should be prepended to the packet. If this flag is asserted, then the number of bytes is in Encap Byte Count field, and the bytes to be encapsulated is in the Encap Header field.

Encap Byte Count. Number of bytes to be prepended to the packet.

Encap Header. The actual bytes to be prepended.

Next Table Type. If non-zero, this indicated that a further lookup is required. This gives the table type. For example, layer 3 routing or layer 3 connection table type. A layer 3 routing lookup would use a longest prefix match lookup algorithm using the destination IP address. A layer 3 connection lookup would use a 104 bit hash algorithm using source and destination addresses, source and destination ports, and protocol.

Next Table Addr. There can be multiple next tables, and multiple next tables of the same type. This field specifies the base address of the table.

The flags get set or cleared by the management process. Signaling and setting up connections are part of the network system that will determine that a certain path through the network requires a change of the header. There can be many reasons why a header can change. Usually a header change is used when the protocol changes from one network domain to another.

Figure 6:
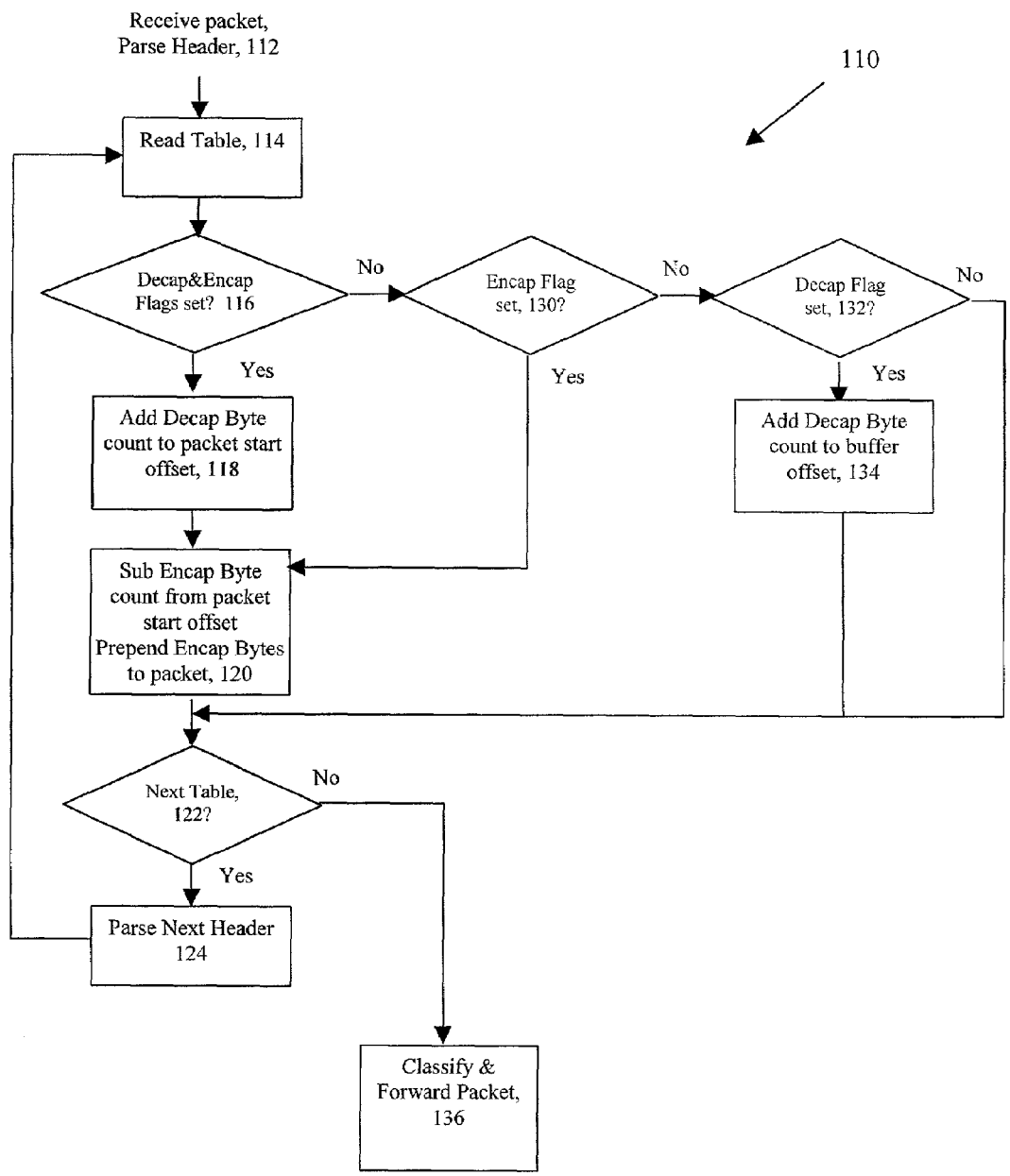
FIG. 6 is a flow chart depicting a generic packet forwarding process.

Referring now to FIG. 6, a process 110 for encapsulating/decapsulating generic protocols is shown. Initially one of the microengines 22a–22f receives 112 a packet from the network interface. The packet is comprised of one or more headers followed by a payload. The microengine, e.g., 22a copies the payload portion of the packet to a packet buffer in DRAM and it may place the packet at an offset in the buffer to make room for any new header that could be prepended to the packet for packet forwarding. The packet offset parameter for that packet is set to a default value determined at the offset into the buffer. The microengine reads 114 in the first header of the packet and performs a layer 2 look-up. The layer 2 look-up will read the table layer 2 bridge table and/or layer 2 connection table. The tables will return various parameters such as decap or encap flags. The process 110 will determine 116 if the decap or encap flags are set. If the decap and encap flags are set, the process will add 118 the decap byte count to the packet start offset and will subtract 120 the encap byte count from the packet start offset and prepend the encap bytes to the packet. The process 110 tests 122 if there is a next table to examine by looking at the blank field in the currently read table. If there is a next table, the process 110 will parse the next header 124, fetch and read the next table. The process 110 continues looking to test the decap or encap flags being set.

If, however, the process did not determine that the decap and encap flags were set (116, above), it would determine 130 if the encap flag or the decap flag were set 132. If the encap flag was set, it will subtract 120 the encap flag byte count from the start offset and prepend the encap bytes to the packet. On the other hand, if the decap flag was only set 132, the process will add 134 a decap byte count to the buffer offset and, in any event, will check the next table 112. When the process determines that it is at the end of checking the tables, it will then classify and forward 136 the packet in a conventional manner. That is, the "no" condition indicates that the process can classify and forward. Forwarding the header can have the microengine take the header and send it to the processor 20 or elsewhere, so that it can get reassembled with the payload. Forwarding the header could also involve forwarding the packet, etc.

Figure 7:
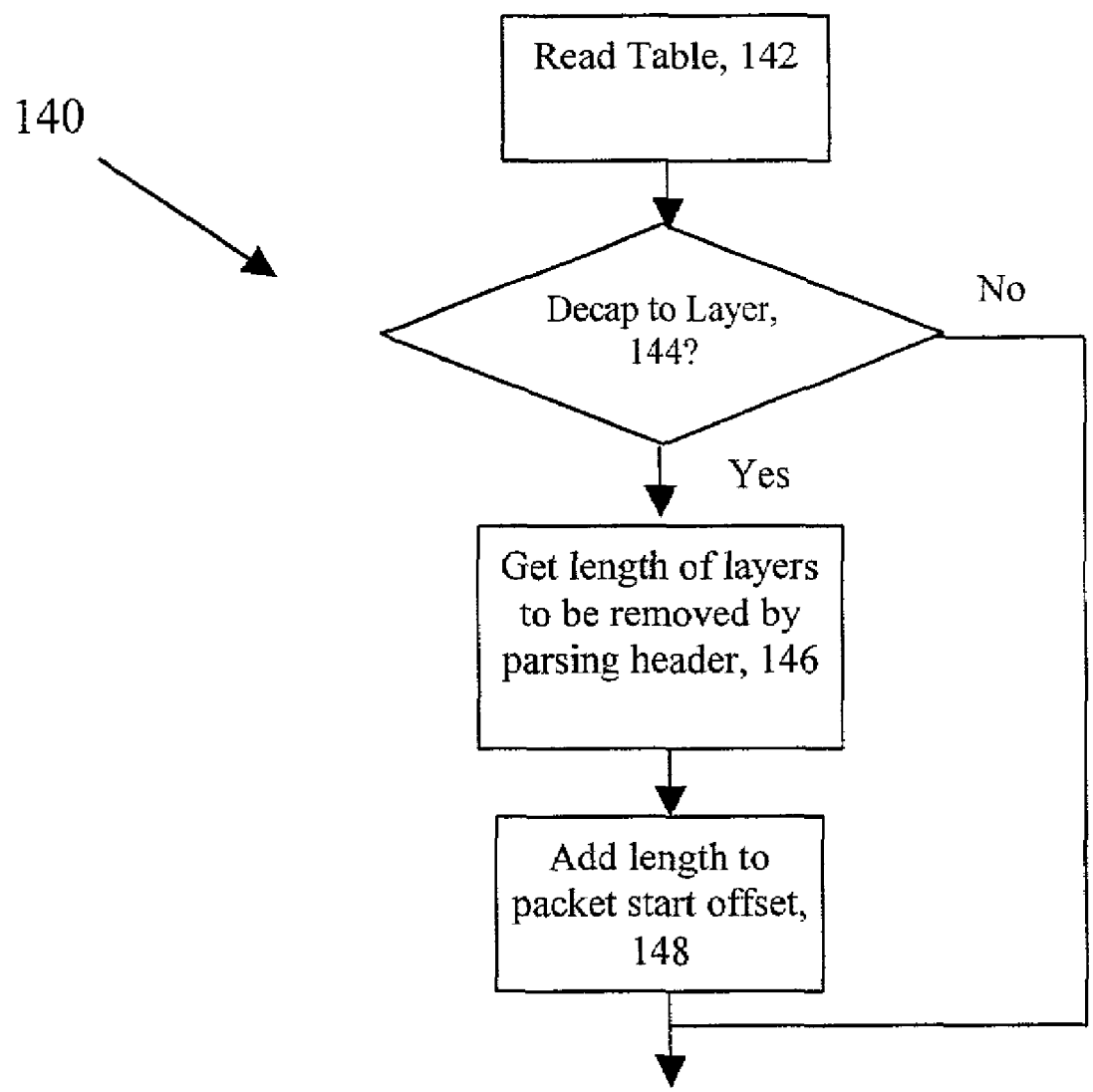
FIG. 7 is a flow chart depicting an alternative aspect of the packet forwarding process of FIG. 6.

Referring now to FIG. 7, in addition to specifying byte dissemination counts obtained from the look-up table. The look-up table may have the decap to layer field set in the table. This field specifies that the front portion of a packet should be decapsulated up to a certain layer. As known, packets are defined in protocol layers used in the OSI (Open Systems Interconnect) seven layer network protocol. After passing through physical layer 1, the first software layer seen by the network processor layer is layer 2, also referred to as the link layer. The length of the bytes to be decapsulated is determined by parsing the packet layers prior to the layer that is to be the new start of the packet. The length can be added to the packet start offset.

FIG. 7 shows a variation where the decapsulation length is not specified in the table, but is determined by reading the packet itself. In other words, this would be a set of routines that would be inserted into the processing of FIG. 6 substitute encapsulated byte count from the packet into the offset.

A process 140 to determine this offset is shown in FIG. 7. The process 140 includes reading the table 142, determining that the decap to packet layer bit 144 has been set, and if set, retrieve the length of the layer to be removed by parsing the header 146 and adding the length to the packet start offset 148. If the decap layer has not been set then the process simply skips. In any event, this process can be prepended to the process described in conjunction with FIG. 6.

A typical use of a decap to layer bit is to specify a decapsulation up to the layer 3 IP header. If the packet encapsulation is a multiprotocol over an ATM network such as the RFC 1483 standard, the layer 2 header length is determined by parsing the layer to header itself using the RFC 1483 length rules. However, if the packet encapsulation is classical IP the layer 2 length is determined by following the classical IP layer length rules. The packet encapsulation may be known by the port type it came in on from the prepended custom header from that port or may be obtained from the first look-up table in the current encap field.

Rather that each network protocol defining a separate protocol conversion this technique provides a generic approach. The approach saves code space and software development time-to-market. In an alternative embodiment, this technique can be implemented as a software library routine, e.g., a generic software building block for decapsulation/encapsulation, where customers can insert their proprietary header encapsulation and a customer's vendor need not get involved with customer's proprietary protocol designs.

A number of embodiments of the invention have been described. Nevertheless, it will be understood that various modifications may be made without departing from the spirit and scope of the invention. Accordingly, other embodiments are within the scope of the following claims.

What is claimed is:

1. A method of forwarding a network packet comprising:
   reading a table containing a plurality of flags to determine which of the plurality of flags is set or cleared;
   determining if the table returned decapsulate and encapsulate flags;
   adding a decapsulate byte count to a packet start offset and subtracting an encapsulate byte count from the packet start offset if the decapsulate and encapsulate flags are set; and
   prepending encapsulate bytes to the packet.

2. The method of claim 1 wherein the table is populated with forwarding information.

3. The method of claim 1 wherein a forwarding table structures includes a control and management structure including a network stack interface and table managers.

4. The method of claim 3 wherein the table managers manage routing tables and can include a plurality of tables including a layer 3 connection table, a layer 3 destination table, a layer 2 bridge table and a layer 2 connection table.

5. The method of claim 1 wherein the table includes a flag to indicates whether the bytes should be stripped from the packet and a field that indicates the number of bytes to be stripped.

6. The method of claim 1 wherein the tables includes a field that specifies decapsulation of header layers up to a specified layer.

7. The method of claim 1 wherein the tables includes a field that specifies an identifier of the current packet encapsulation type.

8. The method of claim 1 wherein the tables includes a flag that indicates whether bytes should be prepended to the packet, a field that specifies the number of bytes and the bytes to be encapsulated.

9. The method of claim 1 wherein the tables includes a Next Table Type field which indicates that a further lookup is required and identifies the table type.

10. A method for encapsulating/decapsulating packets comprising:
    receiving a packet;
    reading in a first header of the packet and performing a layer 2 look-up reading a connection table which returns parameters;
    determining if the table returned decapsulate and encapsulate flags;
    adding a decapsulate byte count to a packet start offset and subtracting an encapsulate byte count from the packet start offset if the decapsulate and encapsulate flags are set; and
    prepending the encapsulate bytes to the packet.

11. The method of claim 10 further comprising:
    determining if there is a next table to examine by looking at a blank field in the currently read table.

12. The method of claim 11 wherein if there is a next table,
    parsing the next header and fetch and read the next table.

13. The method of claim 10 wherein if the decapsulate and encapsulate flags were not set,
    determine if the encapsulate flag or the decapsulate flag were set.

14. The method of claim 10 wherein if the encapsulate flag was set,
    subtract the encapsulate flag byte count from the start offset and prepend the encapsulate flags to the packet.

15. The method of claim 10 wherein if the decapsulate flag was set add a decapsulate byte count to the buffer offset and check the next table.

16. The method of claim 10 wherein the packet is comprised of one or more headers followed by a payload, the method further comprises:
    copying the payload portion of the packet to a packet buffer.

17. The method of claim 16 wherein copying may place the packet at an offset in the buffer to make room for any new header that could be prepended to the packet for packet forwarding.

18. A computer program product residing on a computer readable media for forwarding a network packet comprises instructions to cause a computer to:
    read a table containing a plurality of flags to determine, which of the plurality of flags is set or cleared;
    determine if the table returned decapsulate and encapsulate flags;
    add a decapsulate byte count to a packet start offset and subtract an encapsulate byte count from the packet start offset if the decapsulate and encapsulate flags are set; and
    prepend encapsulate bytes to the packet.

19. The computer program product of claim 18 wherein the table is populated with forwarding information.

20. The computer program product of claim 18 wherein a forwarding table structures include a control and management structure including a network stack interface and table managers.

21. A computer program product residing on a computer readable media for forwarding a network packet comprises instructions to cause a computer to:
    receive a packet;
    read in a first header of the packet and perform a layer 2 look-up reading a connection table which return parameters;
    determine if the table returned decapsulate and encapsulate flags;
    add a decapsulate byte count to a packet start offset and subtracting an encapsulate byte count from the packet start offset if the decapsulate and encapsulate flags are set; and
    prepend encapsulate bytes to the packet.

22. The computer program product of claim 21 further comprising instructions to:
    determine if there is a next table to examine by looking at a blank field in the currently read table.

23. The computer program product of claim 22 wherein if there is a next table, the computer program executes instructions to:
    parse the next header and fetch and read the next table.

24. The computer program product of claim 21 wherein the packet is comprised of one or more headers followed by a payload, the computer program product further executes instructions to:
    copy the payload portion of the packet to a packet buffer.

25. The computer program product of claim 24 wherein instructions to copy place the packet at an offset in the buffer to make room for any new header that could be prepended to the packet for packet forwarding.

26. A processor for processing a network packet comprises:
  a computer storage media storing instructions to cause a computer to:
  read a table containing a plurality of flags to determine, which of the plurality of flags is set or cleared; end
  determine if the table returned decapsulate and encapsulate flags;
  add a decapsulate byte count to a packet start offset and subtract an encapsulate byte count from the packet start offset if the decapsulate and encapsulate flags are set; and
  prepend the encapsulate bytes to the packet.

27. The processor of claim 26 wherein the table contains forwarding information.

28. An apparatus comprising:
  means for reading a table containing a plurality of flags to determine which of the plurality of flags is set or cleared;
  means for determining if the table returned decapsulate and encapsulate flags;
  means for adding a decapsulate byte count to a packet start offset and for subtracting an encapsulate byte count from the packet start offset if the decapsulate and encapsulate flags are set; and
  means for prepending the encapsulate bytes to the packet.

29. The apparatus of claim 28 wherein the table is populated with forwarding information.

30. The apparatus of claim 28 wherein a forwarding table structure includes a control and management structure including a network stack interface and table managers.

31. The apparatus of claim 30 wherein the table managers manage routing tables and can include a plurality of tables including a layer 3 connection table, a layer 3 destination table, a layer 2 bridge table and a layer 2 connection table.

* * * * *